(12) United States Patent
Lockwood (10) Patent No.: US 8,626,248 B2
(45) Date of Patent: *Jan. 7, 2014

(54) MOBILE DEVICE DISPLAY MANAGEMENT (71) Applicant: Google Inc., Mountain View, CA (US)

(72) Inventor: Michael Lockwood, Lexington, MA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/916,400

(22) Filed: Jun. 12, 2013

(65) Prior Publication Data
US 2013/0281163 A1 Oct. 24, 2013

Related U.S. Application Data (63) Continuation of application No. 13/656,019, filed on Oct. 19, 2012, now Pat. No. 8,478,353, which is a continuation of application No. 13/028,909, filed on Feb. 16, 2011, now Pat. No. 8,320,970.

(51) Int. Cl.
H04M 1/00 (2006.01)
G09G 5/00 (2006.01)

(52) U.S. Cl.
USPC .......................................... 455/566; 345/214

(58) Field of Classification Search
USPC .................................................. 455/566
See application file for complete search history.

(56) References Cited

U.S. PATENT DOCUMENTS

| | | | |
|---|---|---|---|
| 5,586,182 A * | 12/1996 | Miyashita | 379/413 |
| 7,042,391 B2 | 5/2006 | Meunier et al. | |
| 7,302,280 B2 | 11/2007 | Hinckley et al. | |
| 7,633,076 B2 | 12/2009 | Huppi et al. | |
| 7,698,719 B2 | 4/2010 | Evans et al. | |
| 7,702,282 B2 | 4/2010 | Sandegard et al. | |
| 7,728,316 B2 | 6/2010 | Fadell et al. | |
| 8,170,621 B1 | 5/2012 | Lockwood | |
| 2003/0197597 A1 | 10/2003 | Bahl et al. | |
| 2004/0233153 A1 | 11/2004 | Robinson | |
| 2006/0017692 A1 | 1/2006 | Wehrenberg et al. | |
| 2006/0240866 A1 * | 10/2006 | Eilts | 455/556.1 |
| 2008/0303681 A1 | 12/2008 | Herz et al. | |
| 2009/0262078 A1 | 10/2009 | Pizzi | |
| 2010/0321321 A1 | 12/2010 | Shenfield et al. | |
| 2011/0216093 A1 | 9/2011 | Griffin | |

OTHER PUBLICATIONS

U.S. Appl. No. 13/028,909, filed Feb. 16, 2011.
Non-Final Office Action from U.S. Appl. No. 13/028,909, dated Apr. 4, 2012, 16 pp.
Response to Non-Final Office Action from U.S. Appl. No. 13/028,909, filed Jul. 5, 2012, 8 pp.
International Search Report and Written Opinion of international application No. PCT/US2011/037342, mailed Jan. 19, 2012, 9 pp.

(Continued)

Primary Examiner — Temica M Beamer
Assistant Examiner — Joel Ajayi
(74) Attorney, Agent, or Firm — Shumaker & Sieffert, P.A.

(57) ABSTRACT

The display of a mobile device is managed during a voice communication session using a proximity sensor and an accelerometer. In one example, the display of a mobile device is turned off during a phone call on the mobile device when a proximity sensor detects an object is proximate the device and an accelerometer determines the device is in a first orientation.

21 Claims, 8 Drawing Sheets (56) References Cited

OTHER PUBLICATIONS

Notice of Allowance from U.S. Appl. No. 13/028,909, dated Jul. 19, 2012, 9 pp.
Notice of Allowance from U.S. Appl. No. 13/250,870, dated Jan. 3, 2012, 9 pp.
Notice of Allowance from U.S. Appl. No. 13/656,019, dated Mar. 4, 2013, 19 pp.
U.S. Appl. No. 13/656,019, filed Oct. 19, 2012.
U.S. Appl. No. 13/250,870, filed Sep. 30, 2011.
Patent Examination Report No. 1 from corresponding Australian application No. 2011359371, dated Aug. 23, 2013, 3 pp.
International Preliminary Report on Patentability and Written Opinion from corresponding International application No. PCT/US2011/037342, dated Aug. 29, 2013, 6 pp.
Response to Patent Examination Report No. 1, dated Aug. 23, 2013, from corresponding Australian application No. 2011359371, filed Sep. 3, 2013, 16 pp.

* cited by examiner

MOBILE DEVICE DISPLAY MANAGEMENT

CROSS-REFERENCE TO RELATED APPLICATIONS

This application is a continuation of U.S. application Ser. No. 13/656,019, filed Oct. 19, 2012, which is a continuation of U.S. application Ser. No. 13/028,909, filed Feb. 16, 2011 know U.S. Pat. No. 8,320,970), the entire contents of each of which is incorporated herein by reference.

BACKGROUND

Mobile devices provide the benefit of being portable while allowing a user to perform a variety of functions including various forms of communication and computing. For example, some mobile devices are capable of accessing the Internet, executing gaming applications, playing videos and music, as well as providing functionality of a traditional mobile, e.g. cellular, phone. As mobile devices are not tethered to a physical communication medium or stationary power source, such devices are generally powered by a rechargeable battery. A persistent challenge in mobile device design is increasing the length of time the device may operate without recharging the battery.

SUMMARY

In general, this disclosure is directed to techniques for managing the display of a mobile device during a voice communication session, e.g. during a phone call. In one example, a method includes detecting, during a phone call on a mobile device, an object proximate the mobile device using a proximity sensor of the mobile device, determining, during the phone call, the mobile device is in a first orientation using an accelerometer of the mobile device, and turning off a display of the mobile device during the phone call in response to detecting the object proximate the mobile device and detecting the mobile device is in the first orientation.

In another example, a mobile device includes a display, a proximity sensor, and an accelerometer. The proximity sensor is configured to detect an object proximate to the mobile device. The accelerometer is configured to determine an orientation of the mobile device. The device also includes means for turning off the display of the mobile device during a phone call on the mobile device in response to the proximity sensor detecting the object is proximate the mobile device and the accelerometer determining the mobile device is in a first orientation.

In another example, a computer readable storage medium includes instructions for causing a programmable processor to turn off a display of a mobile device during a phone call on the mobile device in response to a proximity sensor of the mobile device detecting an object proximate to the mobile device and an accelerometer of the mobile device determining the mobile device is in a first orientation.

The details of one or more embodiments of the disclosure are set forth in the accompanying drawings and the description below. Other features, objects, and advantages of the disclosure will be apparent from the description and drawings, and from the claims.

DETAILED DESCRIPTION

This disclosure is directed to techniques for managing the state of a display of a mobile device during a voice communication session, e.g. during a phone call. The disclosure includes techniques for using a proximity sensor and an accelerometer to manage the mobile device display and only turn off the display during phone calls if the proximity sensor is active and the accelerometer indicates the mobile device is being held in a particular orientation.

Mobile device displays, e.g. mobile phone displays are often a significant source of power drain on the battery of the phone. As such, disabling the display, e.g. turning the display off, whenever it is not in use, may extend the battery life of the phone, which may, in turn, increase the use of the phone and improve user experience. Some current mobile phones employ a proximity sensor to manage a mobile phone display while in call. For example, when in a call, an algorithm may force the display to turn off when the proximity sensor detects that an object (e.g. user's head) is close to the phone. However, this approach may cause problems if the user attempts to use other features of the phone while in a call. For example, the proximity sensor of a mobile phone may be located proximate the top left of the mobile phone display. If, for example, a user of the mobile phone wants to look up something in email while in a call, the user's finger may trigger the proximity sensor, which may cause the display to turn off while the user is attempting view information and execute functions on the phone.

In order to address the foregoing issues, the examples included in this disclosure use both the proximity sensor and an accelerometer. In such examples, a mobile device, e.g. a mobile phone only turns off the phone display if the proximity sensor detects an object proximate the phone and the accelerometer indicates the phone is being held in a particular orientation, e.g., a vertical orientation. Such a vertical orientation can occur if the phone is being held up against the user's head. Additionally, under certain circumstances, if the phone is being held close to another orientation, e.g., a horizontal orientation, which can occur during a phone call, under common usage circumstances it may be assumed that the user is trying to access functions on the phone while in the call and ignore proximity sensor signals such that the display remains on until the phone is held upright again.

In one example, after a call is initiated on a mobile phone, a display management algorithm may detect whether there is an object proximate the phone with a proximity sensor and determine the orientation of the phone with an accelerometer. If the proximity sensor is active, indicating that the phone is within some threshold distance from another object (presumably a part of the user's body), and if the accelerometer indicates that the phone is, e.g. vertical, then the display management algorithm will turn off the display. Thereafter, if the foregoing process has occurred to turn off the display during a phone call, the display management algorithm may turn on the phone display regardless of the behavior of proximity sensor when the accelerometer indicates the phone moves to, e.g. a horizontal or near horizontal position. Thus, the algorithm infers that the user has, while still in the phone call, moved the phone from the head into a horizontal position to access phone functions and therefore needs the phone display turned on.

The following examples describe the use of a proximity sensor to detect when objects are proximate a mobile phone. The term proximate refers to a distance between the mobile phone and another object that is within the sensing range of a proximity sensor included in the phone such that when the object is proximate the mobile phone, the proximity sensor is activated. Additionally, the disclosed examples describe the use of an accelerometer to determine the orientation of a mobile phone. In some examples, specific orientations are described, including, e.g. horizontal and vertical. While the terms horizontal and vertical, as well as other designations of orientation, may be relative, in the disclosed examples such designations may refer to specific orientations of a mobile phone relative to the earth. For example, vertical may refer to a direction that is approximately perpendicular to the earth and horizontal may refer to a direction that is approximately parallel to the earth. Additionally, specific orientation designations may not, in the disclosed examples, necessarily be exact. For example, a vertical orientation may refer to a mobile phone that is oriented approximately vertical, where the approximation may be defined by a specific tolerance within which the phone's orientation must lie to designate the phone in the vertical orientation. Specific examples of determining the orientation of a mobile phone, including the use of approximations of different orientations are described in more detail below.

Although the following examples are described with reference to an accelerometer determining a mobile phone in vertical and horizontal orientations as a basis for managing the display of the phone, other orientations of the phone may form the basis for triggering different states of the display. For example, the phone may turn off the display in response to, among other parameters, an accelerometer determining that the phone is in a horizontal orientation and may turn the display back on in response to the accelerometer determining the phone is in a vertical orientation. More generally, a mobile phone in accordance with this disclosure may turn off the display of the phone during a voice communication session, e.g. during a phone call when a proximity sensor detects an object proximate the phone and an accelerometer determines the phone is in a first orientation.

Figure 1:
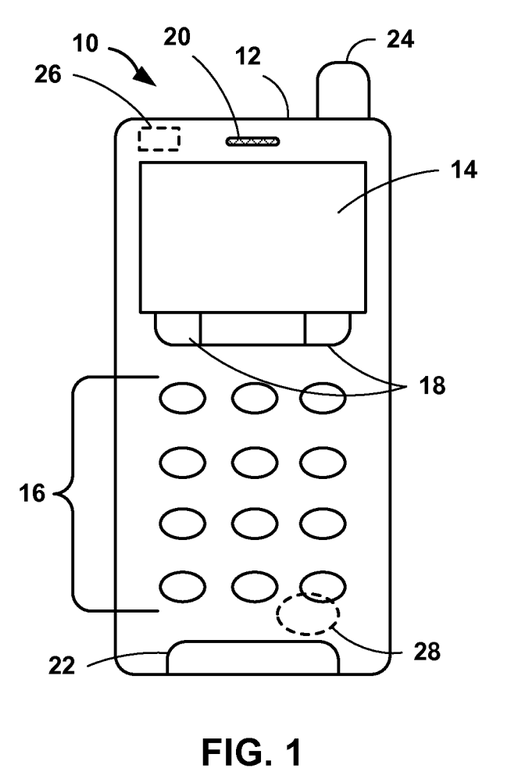
FIG. 1 is a plan view of an example mobile device in accordance with various aspects of this disclosure.
Figure 8A:
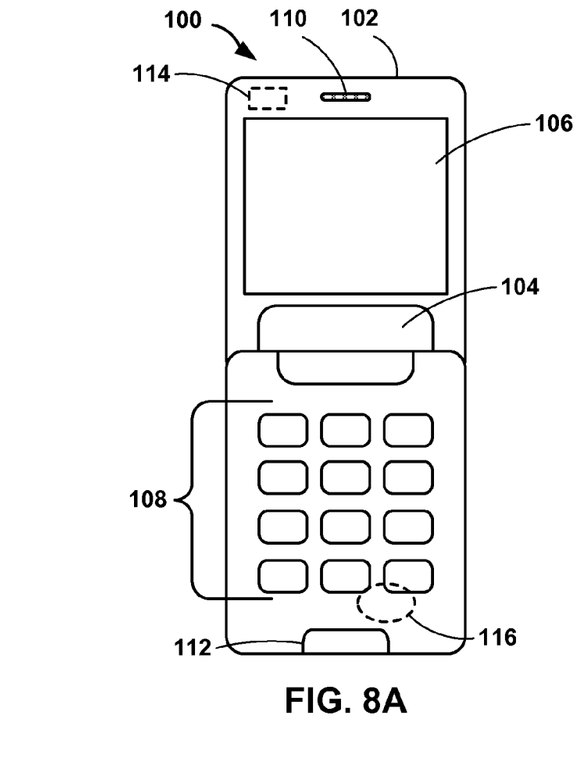
FIGS. 8A and 8B are plan views of two alternative example mobile devices in accordance with this disclosure.
Figure 8B:
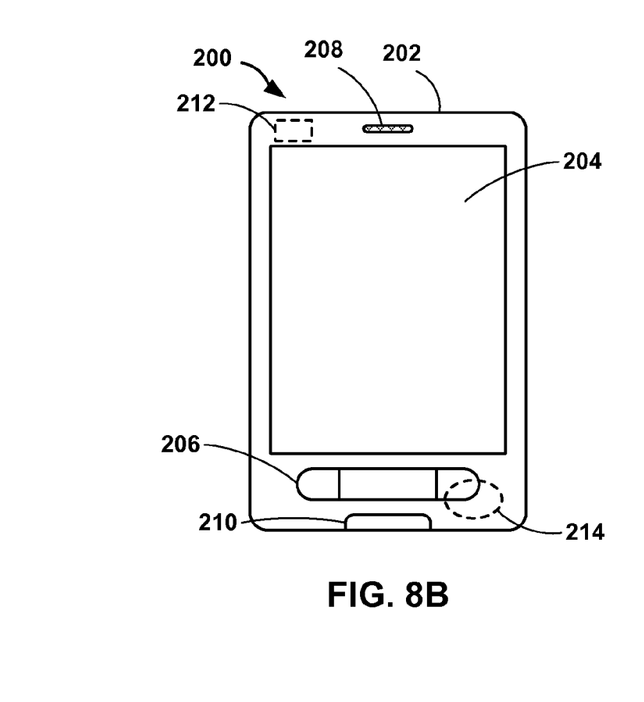

FIG. 1 is a plan view of example mobile phone 10 including housing 12, display 14, a user interface, including keypad 16 and soft keys 18, speaker 20, microphone 22, external antenna 24, proximity sensor 26, and accelerometer 28. As illustrated in FIGS. 8A and 8B described below, example mobile devices according to this disclosure may include a number of different styles and forms than that of example mobile phone 10 of FIG. 1.

In FIG. 1, display 14 is positioned at an upper half of housing 12 of mobile phone 10. Display 14 may include any one or more of a liquid crystal display (LCD), dot matrix display, light emitting diode (LED) display, organic light-emitting diode (OLED) display, touch screen, e-ink, or similar monochrome or color display capable of providing visible information to users of mobile phone 10. Display 14 may provide a user interface related to functionality provided by mobile phone 10. For example, display 14 may present a user with an address book stored on mobile phone 10, which includes a number of contacts. In another example, display 14 may present the user with a menu of options related to the function and operation of mobile phone 10, including, e.g. phone settings such as ring tones and phone modes, e.g. silent, normal, meeting, and other configurable settings for the phone.

Keypad 16 is in a bottom half of housing 12. In one example, keypad 16 is an alphanumeric keypad that users may employ to enter phone numbers, contacts, and other information for use with mobile phone 10. Soft keys 18 are positioned adjacent and below display 14. In one example, soft keys 18 may be configured to execute different functions on mobile phone 10 based on, e.g., current functions and contexts indicated on display 14. For example, one of soft keys 18 may correspond to a menu key as a default option, from which a number of different functional options available on mobile phone 10 may be selected, e.g. looking up a contact in an address book stored on the phone. In one example, once soft key 18 is selected to retrieve the address book and a contact is located, the same soft key may change from a menu option to one of a number of options for interacting with the contact data, e.g. editing the information for the contact in the address book stored on mobile phone 10.

Mobile phone 10 also includes speaker 20 and microphone 22, which may function to emit audible sounds to and receive audible input from users, respectively. For example, speaker 20 may be configured to emit the voice of a person calling mobile phone 10 and microphone 22 may be configured to receive the voice of the user of mobile phone 10 to be transmitted to the person calling mobile phone 10. In FIG. 1, speaker 20 toward the top of housing 12 above display 14. Microphone 22, on the other hand, is arranged toward the bottom of housing 12 below keypad 16. In this manner, the positions of speaker 20 and microphone 22 may generally correspond to a user's ear and mouth, respectively. In other examples, however, speaker 20 and microphone 22 may be arranged in other locations on housing 12.

Antenna 24 of mobile phone 10 extends up from the top of housing 12. However, in another example, antenna 24 may extend from a different portion of housing 12 or may form part of the housing. Additionally, in some example mobile devices according to this disclosure, the antenna of the device may be internal and thus not visibly extending from any part of the device housing. Antenna 24 may function to facilitate communications between mobile phone 10 and other devices, e.g. other mobile devices, remote service provider networks and computing devices, and the like. As such, in one example, antenna 24 may be any of a number of radio frequency (RF) antennas appropriate for use with mobile devices and configured to transmit and receive RF communications, including, e.g., telephone calls transmitted over a cellular network.

Mobile phone 10 includes proximity sensor 26 and accelerometer 28. Proximity sensor 26 is arranged toward an upper corner of mobile phone 10 within housing 12. Accelerometer 28 is arranged toward a lower corner of mobile phone 10, also within housing 12. Proximity sensor 26 and accelerometer 28 may be arranged in a number of different locations with respect to mobile phone 10 in other examples according to this disclosure. Additionally, in other examples, one or both of proximity sensor 26 and accelerometer 28 may not be arranged within housing 12. For example, proximity sensor 26 may be connected to housing 12 and be arranged such that at least part of the sensor lies outside of the housing.

Proximity sensor 26 and accelerometer 28, along with, e.g. a processor of mobile phone 10, may be configured to act together to manage display 14 during a phone call made with mobile phone 10. In one example, after a phone call is initiated on mobile phone 10, either an outgoing call made to or an incoming call received by the phone, proximity sensor 26 may be employed to detect the presence of an object proximate to mobile phone 10. For example, proximity sensor 26 may be configured such that the sensor is activated when an object is within a threshold distance from the sensor.

In addition to proximity sensor 26 detecting an object proximate mobile phone 10, accelerometer 28 may determine the orientation, e.g. horizontal or vertical, of the mobile phone during the phone call. In one example, mobile phone 10 may be configured to turn off display 14 when proximity sensor 26 detects an object proximate the mobile phone and accelerometer 28 determines that the phone is in an approximately vertical orientation. The manner in which a proximity sensor and accelerometer function in a mobile phone to manage the display of the phone during a voice communication session in examples according to this disclosure is described in greater detail with reference to the example method of FIG. 4 below.

Figure 2:
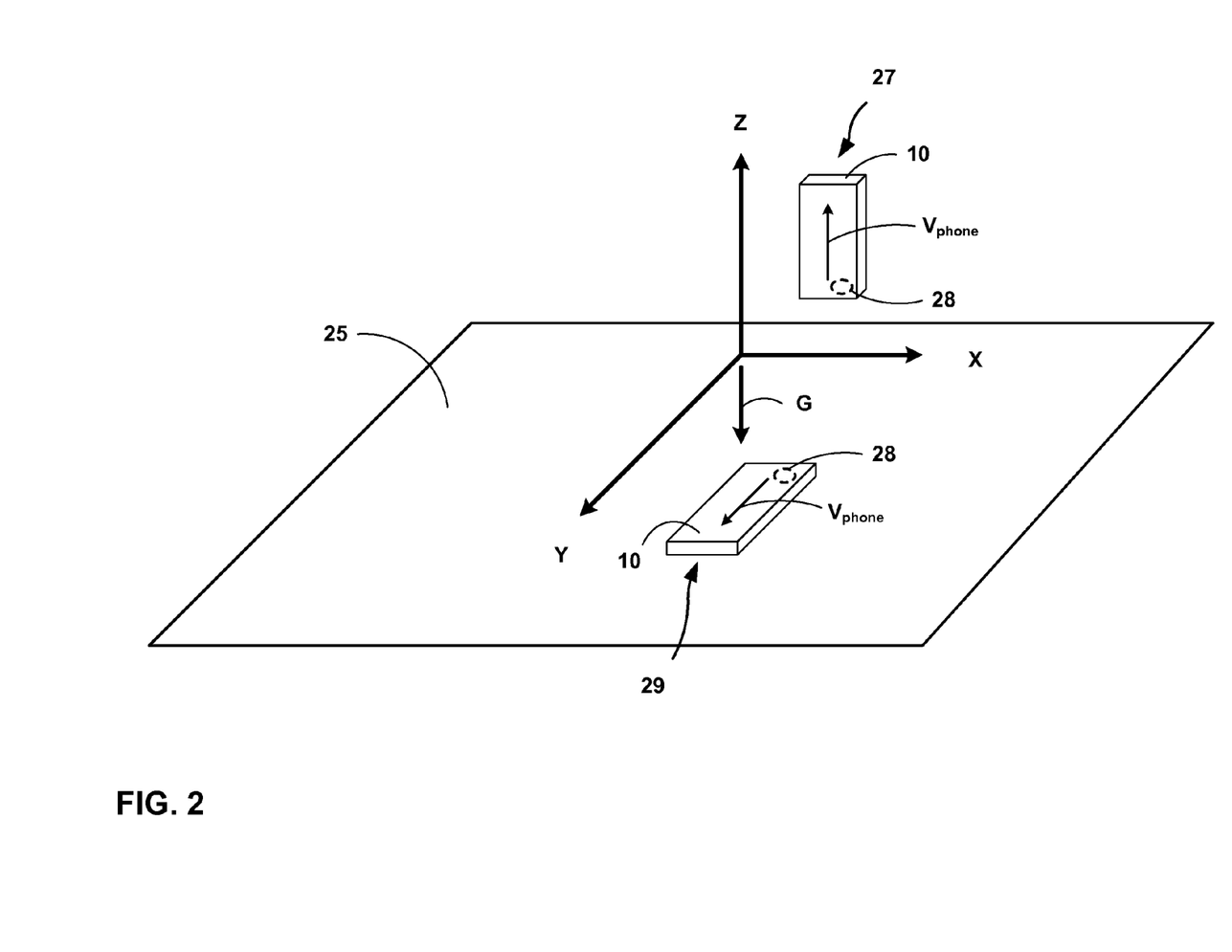
FIG. 2 illustrates an example frame of reference in which an accelerometer of the mobile device of FIG. 1 may detect the orientation of the device.

As noted above, while the terms horizontal and vertical, as well as other designations of orientation, may be relative, in the disclosed examples such designations may refer to specific orientations of a mobile phone relative to the earth. An example frame of reference in which accelerometer 28 may determine the orientation of mobile phone 10 is illustrated in FIG. 2. In one example, accelerometer 28 may be configured to determine the orientation of mobile phone 10 in a reference Cartesian coordinate system illustrated in FIG. 2, in which the Z axis is parallel to gravity vector, G, and the X and Y axes are generally parallel to ground 25, which may be the earth, and perpendicular to each other and to the Z axis. In the example frame of reference of FIG. 2, vertical generally corresponds to an orientation that is parallel to gravity, G, but in the opposite direction, i.e. directed away from instead of toward ground 25.

In the example of FIG. 2, the orientation of mobile phone 10 determined by accelerometer 28 is represented by orientation vector, $V_{phone}$. The manner in which the orientation of mobile phone 10 represented by vector $V_{phone}$ is determined based on signals generated by accelerometer 28 is described in greater de a below. However, in the example of FIG. 2, mobile phone 10 is represented in two different orientations in position 27 and 29, respectively. In position 27, accelerometer 28 determines the orientation of mobile phone 10 represented by vector, $V_{phone}$, as approximately equal to vertical. In position 29, on the other hand, accelerometer 28 determines the orientation of mobile phone 10 represented by vector, $V_{phone}$, as approximately equal to horizontal.

The example of FIG. 2 is meant to illustrate a frame of reference in which the orientation of mobile phone 10 may be identified by relative terms, such as vertical and horizontal. In some examples according to this disclosure, the frame of reference in which an accelerometer determines the orientation of a mobile device, e.g. a mobile phone in order to manage the display of the phone during a phone call may differ from that shown in FIG. 2. However, the examples described below include accelerometers that determine orientations in a frame of reference in accordance with the example of FIG. 2. Thus, vertical and horizontal in such examples correspond to orientations that are treated as generally parallel to gravity and perpendicular to the ground and generally perpendicular to gravity and parallel to the ground, respectively. However, in practice, the orientation of mobile phone 10 may not be exactly or nearly exactly vertical or horizontal as represented by vector, $V_{phone}$, in positions 27 and 29 in FIG. 2. Thus, FIG. 5 and the associated description provided below illustrate how the orientation of a mobile phone may be determined with an accelerometer when the phone is only approximately vertical or horizontal, e.g. as defined in the example of FIG. 2, by employing a range of orientations within which the phone's orientation vector as determined by the accelerometer may lie to designate the phone in a particular orientation.

In some examples, mobile phone 10, or another mobile device according to this disclosure, may include more sensors than just proximity sensor 26 and accelerometer 28. For example, a mobile device according to this disclosure may include multiple accelerometers. Additionally, a mobile device according to this disclosure may include a number of sensors for operating a touch-screen display that is configured to receive tactile input from a user to execute functions on the phone.

Figure 3:
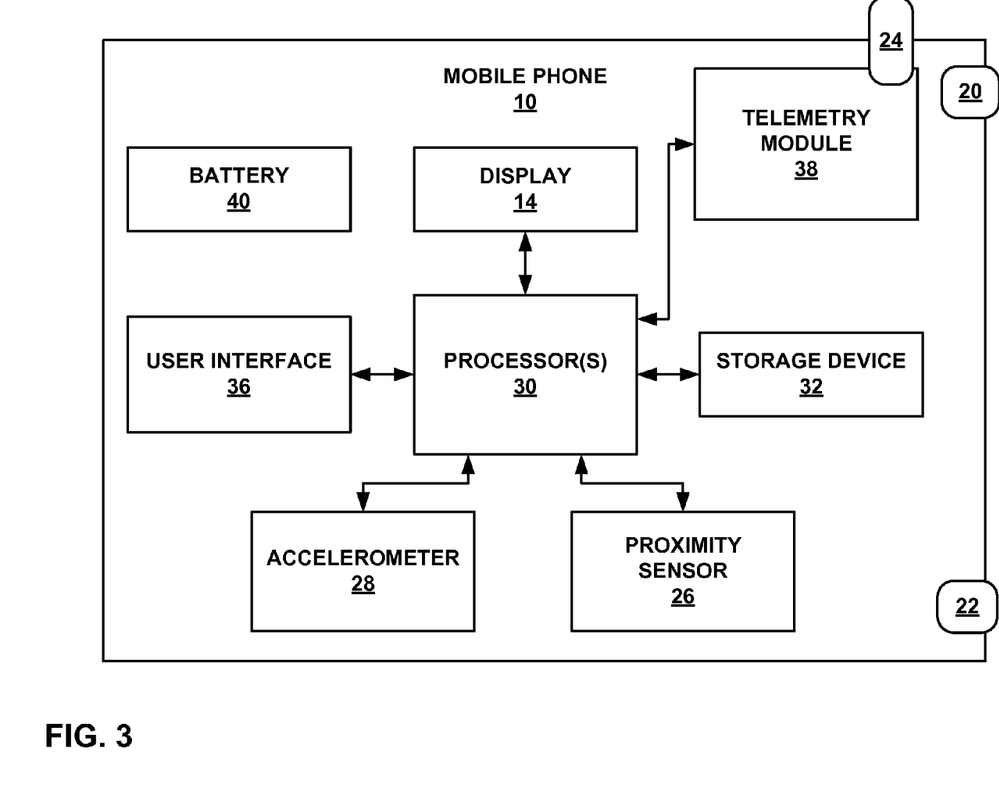
FIG. 3 is a block diagram illustrating an example of the mobile device of FIG. 1.

FIG. 3 is a block diagram illustrating example mobile phone 10 including processor 30, storage device 32, display 14, user interface 36, e.g. including keypad 16 and soft keys 18, telemetry module 38, including, e.g., antenna 24, battery 40, speaker 20, microphone 22, proximity sensor 26, and accelerometer 28. Processor 30, generally speaking, is communicatively coupled to and controls operation of storage device 32, display 14, user interface 36, and telemetry module 38, all of which are powered by rechargeable battery 40. Processor 30 may also be configured to execute one or more of the functions associated with managing display 14 based on information provided by proximity sensor 26 and accelerometer 28.

Processor 30 may include any one or more of a microprocessor, a controller, a digital signal processor (DSP), an application specific integrated circuit (ASIC), a field-programmable gate array (FPGA), or equivalent discrete or integrated logic circuitry. The functions attributed to processor 30 in this disclosure may be embodied as software, firmware, hardware and combinations thereof. Although example mobile phone 10 of FIG. 3 is illustrated as including one processor 30, other example mobile devices according to this disclosure may include multiple processors that are configured to execute one or more functions attributed to processor 30 of mobile phone 10 individually or in different cooperative combinations.

Storage device 32 stores instructions for applications that may be executed by processor 30 and data used in such applications or collected and stored for use outside of mobile phone 10, e.g. object proximity and phone orientation data. For example, storage device 32 may store instructions executable by processor 30 for managing display 14 based on information provided by proximity sensor 26 and accelerometer 28. Storage device 32 may be a computer-readable, machine-readable, or processor-readable storage medium that comprises instructions that cause one or more processors, e.g., processor 30, to perform various functions. Storage device 32 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. Generally speaking, storage device 32 may include instructions that cause processor 30 to perform various functions attributed to the processor in the disclosed examples.

Generally speaking, storage device 32 includes memory that stores software that may be executed by processor 30 to perform various functions for a user of mobile phone 10, including, e.g., making and receiving cellular telephone calls or other communications like text or e-mail messages, using various software applications. The software included in mobile phone 10 may include telemetry and other hardware drivers for the mobile phone, operating system software, as well as a number of third-party applications. The operating system software of mobile phone 10 may be, e.g. Linux software or another UNIX based system software. In another example, the operating system software of mobile phone 10 may be Google's Android. In another example, mobile phone 10 may include proprietary operating system software not based on an open source platform like UNIX or Android. Mobile phone 10 also includes various applications 42 stored on storage device 32 and executed by processor 30, including, e.g., e-mail, calendar, contact management, and web browser applications, as well as various types of third-party vendor applications bundled with the phone.

Operation of mobile phone 10 may require, for various reasons, receiving data from one or more sources including, e.g. application data stored on an application server remote from the phone, as well as transmitting data or other signals from the phone to an external source, e.g. transmitting a user's voice during a phone call to another mobile phone. Data communications to and from mobile phone 10 may be handled by telemetry module 38. Telemetry module 38 is configured to transmit data/requests to and receive data/responses from one or more external sources via, e.g. a cellular network. Telemetry module 38 may support various wireless communication techniques and protocols, and includes appropriate hardware and software to provide such communications. For example, telemetry module 38 may include external antenna 24 shown in FIG. 1, as well as modulators, demodulators, amplifiers, and other circuitry to effectuate communication between mobile phone 10 and other devices via, e.g., a cellular network.

Mobile phone 10 includes display 14, which may be, e.g., a liquid crystal display (LCD), dot matrix display, light emitting diode (LED) display, organic light-emitting diode (OLED) display, touch screen, e-ink, or other display. Display 14 presents the content of mobile phone 10 to a user. For example, display 14 may present the applications executed on phone 10 such as an e-mail or calendar application, as well as information about the mobile phone, including, e.g., battery life and/or network signal strength.

User interface 36 allows a user of mobile phone 10 to interact with the phone via one or more input mechanisms, including keypad 16 and soft keys 18, as well as, e.g., a mouse, a roller ball, buttons, scroll wheel, touch pad, touch screen, or other devices or mechanisms that allow the user to interact with the phone. In some examples, user interface 36 may also include microphone 22 to allow a user to provide voice commands. Users may interact with user interface 36 and/or display 14 to execute one or more applications stored on storage device 32 and executed by processor 30. Some applications may be executed automatically by mobile phone 10, e.g. by processor 30, such as when the phone is turned on or booted up. Additionally, in some examples, users may interact with user interface 36 to configure application data and to execute functions of applications stored on storage device 32.

Battery 40 provides power for all if the various components of mobile phone 10, and may be rechargeable. Examples of battery 40 include a lithium polymer battery, a lithium ion battery, nickel cadmium battery, and a nickel metal hydride battery. The life of battery 40 of mobile phone 10 depends on many factors. Generally speaking, e.g., the life of battery 40 is affected by loads on the battery caused by using either software or hardware components of mobile phone. As different components of mobile phone 10, both different hardware and different software components, draw different amounts of power, the load on battery 40 may vary according to component usage patterns. For example, a backlight for display 14 may draw more power than accelerometer 28 such that the life of battery 40 of mobile phone 10 may decrease significantly with increased backlight usage, while being less impacted by increased usage of the accelerometer. In another example, the network access state of mobile phone 10, e.g. 3G access, may require more power than another network access state, e.g. Wi-Fi access.

Display 14 of mobile phone 10 may draw a significant amount of power from battery 14 when the display is turned on. As such, disabling display 14, e.g. turning the display off whenever it is not in use may extend the life of battery 40, which may, in turn, increase the use of mobile phone 10 and improve user experience. As such, mobile phone 10 includes proximity sensor 26 and accelerometer 28, which may be configured, in conjunction with, e.g. processor 30 to manage display 14 while mobile phone 10 is in a call. Proximity sensor 26 and accelerometer 28, along with, e.g. processor 30 of mobile phone 10, may be configured to act together to manage display 14 during a phone call made with mobile phone 10. In one example, after a phone call is initiated on mobile phone 10, either an outgoing call made to or an incoming call received by the phone, proximity sensor 26 may be employed to detect the presence of an object proximate to mobile phone 10, e.g. the presence of a user's hand or head proximate the phone. For example, proximity sensor 26 may be configured such that the sensor is activated when an object is within a threshold distance from the sensor.

Proximity sensor 26 of mobile phone 10 may be any of a number of types of sensors that are configured to detect the presence of objects nearby mobile phone 10 without any physical contact. Proximity sensor 26 may include, e.g., a capacitive, photoelectric, or inductive sensor. In one example, proximity sensor 26 may emit a beam of electromagnetic radiation, e.g. infrared, and detect a return signal after the beam bounces off an object near mobile phone 10. In another example, proximity sensor 26 may emit an electromagnetic or electrostatic field and detect changes in the field as an object proximate mobile phone 10 enters the field emitted by the sensor. Proximity sensor 26 may be configured to sense objects up to a maximum distance from mobile phone 10, which, in this disclosure, may be referred to as the range of the sensor or as a threshold distance at or within which the sensor detects an object proximate the phone. In one example, the range of proximity sensor 26 may be adjustable. In any event, proximity sensor 26 may be configured to detect an object when the object is within the range of the sensor, i.e. when the object is a threshold distance away from mobile phone 10. In one example, proximity sensor is configured to detect an object when the object is a threshold distance that is greater than or equal to approximately 5 centimeters (cm) away from mobile phone 10.

In addition to proximity sensor 26 detecting an object proximate mobile phone 10, accelerometer 28 may determine the orientation, e.g. horizontal or vertical, of the mobile phone during the phone call. In one example, processor 30 of mobile phone 10 may be configured to turn off display 14 when proximity sensor 26 detects an object proximate the mobile phone, e.g. the head of a user of the phone and accelerometer 28 determines that the phone is in an approximately vertical orientation. Accelerometer 28 may include, e.g., a three-axis accelerometer, capable of determining static orientation or vectors in three-dimensions. In one example, accelerometer 28 includes a micro-electro-mechanical accelerometer. In another example, accelerometer 28 may include a piezoelectric or capacitive accelerometer. In other examples, accelerometer 28 may be any other type of accelerometer capable of determining the orientation of mobile phone 10. Additionally, in some examples, mobile devices in accordance with this disclosure may employ other types of devices in addition to or in lieu of an accelerometer to determine orientation, including, e.g., gyroscopes, pressure transducers or other devices capable of determining the orientation of the mobile device.

In the foregoing manner, proximity sensor 26 and accelerometer 28 may be employed to infer that the user of mobile phone 10 has, after initiating a phone call, raised the phone to the user's head to listen and talk to another person using the phone. In such circumstances, display 14 may be unnecessary and, thus, may be turned off to extend the life of battery 40, as well as reduce the risk of the user's head inadvertently triggering functions of the phone in examples in which display 14 is a touch-screen. Additionally, by employing a proximity sensor 26 and accelerometer 28, mobile phone 10 may be capable of distinguishing between the foregoing use-case and one in which the user's hand triggers proximity sensor 26 when, e.g. the user holds the phone out in front of their body to access other functions while in the phone call, e.g. to look-up a contact in an address book stored on storage device 32. In this circumstance, the user of mobile phone 10 may need display 14 active, e.g. turned on in order to access functionality on the phone. The manner in which a proximity sensor and accelerometer function in a mobile device to manage the display of the device during a phone call in these and other use-case examples is described in greater detail with reference to the example method of FIG. 4 below.

Figure 4:
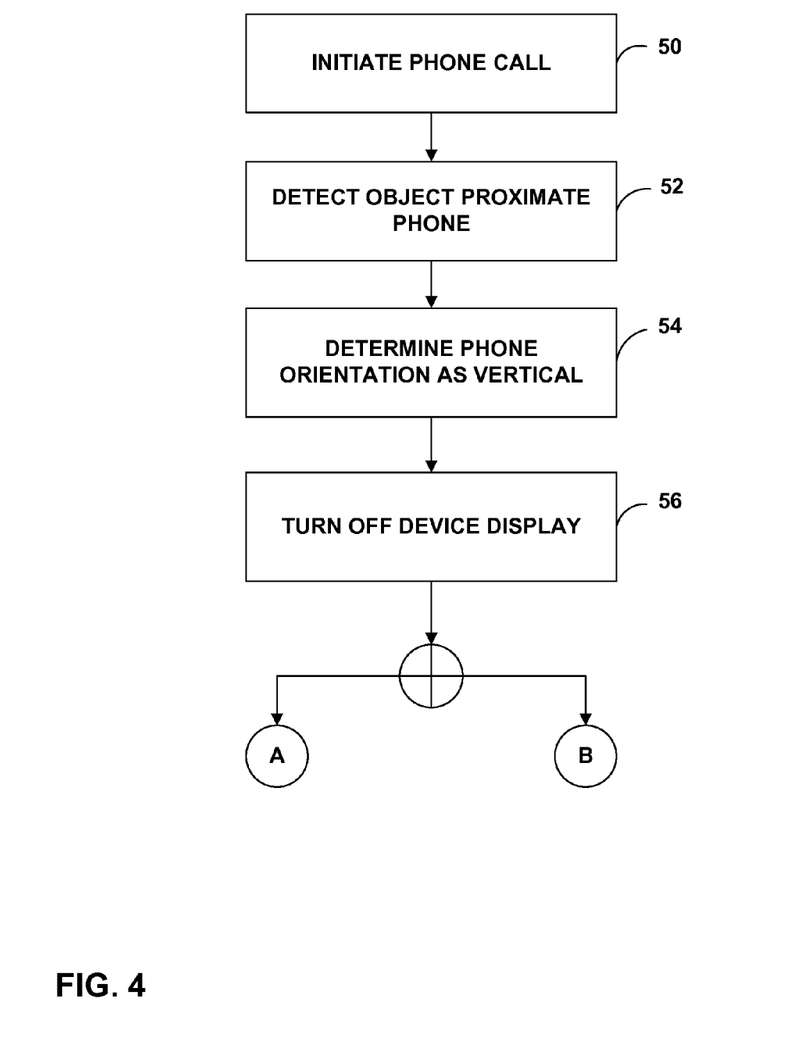
FIG. 4 is a flowchart illustrating an example method of managing the display of a mobile device during a phone call.

FIG. 4 is a flowchart illustrating an example method of managing a display of mobile phone during a phone call. The method of FIG. 4 includes initiating a phone call using a mobile phone (50), detecting an object proximate the mobile phone using a proximity sensor (52), determining an orientation of the mobile phone as approximately vertical using an accelerometer (54), and turning off a display of the mobile phone (56).

The functions of the method of FIG. 4 for managing a display of a mobile phone while in a phone call are described below as carried out by various components of example mobile phone 10, and, in particular, proximity sensor 26, accelerometer 28, and processor 30 of the mobile phone for purposes of illustration only. In other examples, one or more of the functions of the method of FIG. 4 may be carried out by other devices or systems that differ from mobile phone 10 in constitution and arrangement. For example, the method of FIG. 4 may be executed in whole or in part by a different type of mobile phone, including, e.g. a mobile phone including a touch-screen display. Additionally, the method of FIG. 4 may be executed by a mobile phone including more than a proximity sensor and accelerometer, including, e.g., a phone that employs a number of sensors to operate a large touch-screen display. Finally, although the example is described with reference to an accelerometer determining a mobile phone in vertical and horizontal orientations as a basis for managing the display of the phone, other orientations of the phone may form the basis for triggering different states of the display. For example, the phone may turn off the display in response to, among other parameters, an accelerometer determining that the phone is in a horizontal orientation and may turn the display back on in response to the accelerometer determining the phone is in a vertical orientation.

The example method of FIG. 4 includes initiating a phone call using a mobile phone (50). In one example, a phone call is initiated on mobile phone 10. For example, a user of mobile phone 10 may initiate an outgoing phone call to another person, e.g. over a cellular network over which the mobile phone is configured to communicate. In another example, the user of mobile phone 10 may receive and accept a phone call on the mobile phone from another person.

After initiating a phone call on mobile phone 10, the user of the mobile phone may behave in a number of ways while on the call. For example, the user may hold mobile phone 10 up to their head to listen and talk to the other person on the phone call. In another example, however, the user of mobile phone 10 may hold the phone out in front of their body to, e.g., access other functions on the phone while in the call, including, e.g., looking up a contact in an address book stored on storage device 32. Additionally, in one example, the user may first hold mobile phone 10 up to their head to listen and talk and, later in the phone call, hold the phone out in front of their body to access other functions on the phone. In these and other use-case examples, as illustrated by the example method of FIG. 4, mobile phone 10 is equipped with proximity sensor 26 and accelerometer 28 to manage the operation of display 14 during a phone call.

The method of FIG. 4 also includes detecting an object proximate a mobile phone using a proximity sensor (52). In one example, after a phone call is initiated using mobile phone 10 (54), either an outgoing call made to or an incoming call received by the phone, proximity sensor 26 may be employed to detect the presence of an object proximate to mobile phone 10, e.g. the presence of a user's hand or head proximate the phone. For example, proximity sensor 26 may be configured such that the sensor is activated when an object is within a threshold distance from the sensor. Proximity sensor 26 of mobile phone 10 may be any of a number of types of sensors that are configured to detect the presence of objects nearby mobile phone 10 without any physical contact, including, e.g., a capacitive, photoelectric, or inductive sensor. Proximity sensor 26 may be configured to sense objects up to a maximum distance from mobile phone 10, which, in this disclosure, may be referred to as the range of the sensor or as a threshold distance at or within which the sensor detects an object proximate the phone.

As noted above, in prior mobile phones employing proximity sensors, the display of the phone may be turned off responsive only to a proximity sensor. In other words, in the event a proximity sensor detected an object proximate the phone during a call, the phone assumed the object was the user's head and turned off the display. However, in some circumstances, the object proximate the phone may be the user's finger as the user, e.g. quickly looks up something in email while in a call, which may cause the display to turn off while the user is attempting view information and execute functions on the phone. As such, examples according to this disclosure include managing the display of a mobile phone by employing a proximity sensor in conjunction with an accelerometer to determine the orientation of the mobile phone in addition to the presence of an object proximate the phone.

In addition to detecting an object proximate a mobile phone using a proximity sensor (52), the example of FIG. 4 includes determining an orientation of the mobile phone as approximately vertical using an accelerometer (54). In one example, accelerometer 28 may determine the orientation of mobile phone 10 as vertical during the phone call. Accelerometer 28 may include, e.g., a three-axis accelerometer, capable of determining static orientation or vectors in three-dimensions. In one example, accelerometer 28 includes a micro-electro-mechanical accelerometer. In another example, accelerometer 28 may include a piezoelectric or capacitive accelerometer. In other examples, accelerometer 28 may be any other type of accelerometer capable of determining the orientation of mobile phone 10.

As noted above, in practice, the orientation of mobile phone 10 determined by accelerometer 28 may not be exactly or nearly exactly vertical, e.g. as represented by vector, $V_{phone}$, in position 27 in FIG. 2. Therefore, in one example, mobile phone 10 and, in particular, processor 30 of the mobile phone may execute an algorithm, e.g. stored on storage device 32 to determine when the orientation of the phone as determined by accelerometer 28, while not exactly vertical, may be assumed to be vertical for purposes of managing display 14. For example, processor 30 may execute an algorithm that determines when mobile phone 10 is approximately vertical by employing a range of orientations within which the phone's orientation vector as determined by accelerometer 28 may lie to designate the phone in a vertical orientation for purposes of managing display 14.

Figure 5:
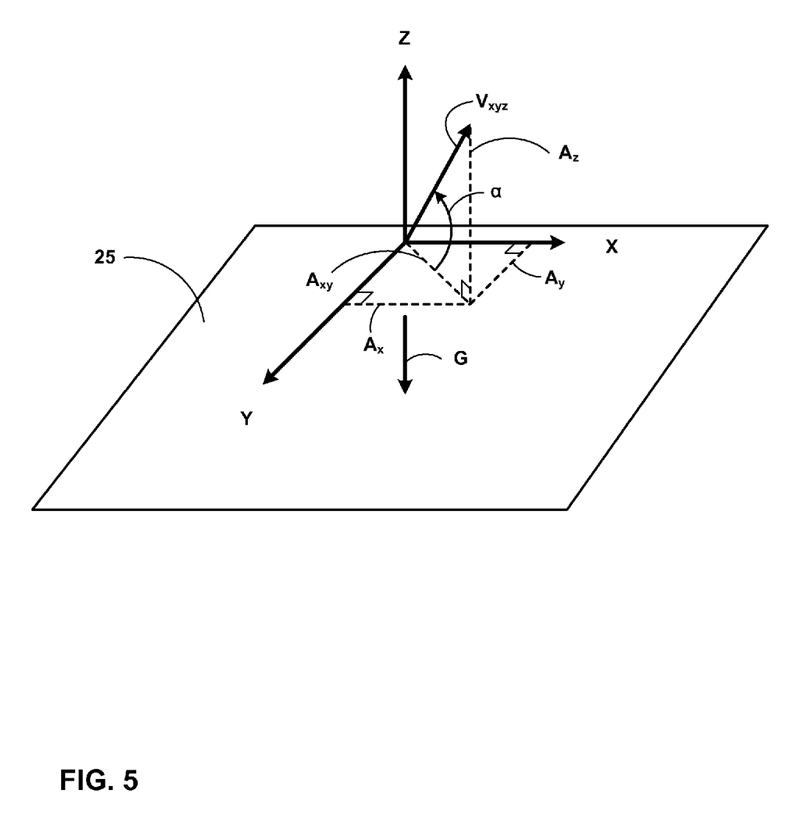
FIG. 5 illustrates an example orientation vector of a mobile device detected by an accelerometer.

In one example, accelerometer 28 of mobile phone 10 determines the orientation of the phone as a vector in three dimensions, which is represented in FIG. 5 as phone vector, $V_{xyz}$. The orientation of mobile phone 10, and, in particular, the vector, $V_{xyz}$ is defined by the magnitudes of the vector in the X, Y, and Z directions $A_x$, $A_y$, and $A_z$, respectively, as well as the angles between the vector and each of the X, Y, and Z axes (not shown in FIG. 5). In one example, processor 30 of mobile phone 10 executes an algorithm that approximates the orientation of the mobile phone as one of horizontal or vertical based on the angle, α, between the phone orientation vector, $V_{xyz}$, and the projection of the vector onto the horizontal X-Y plane.

For example, processor 30 may receive the magnitudes $A_x$, $A_y$, $A_z$ of vector, $V_{xyz}$ in the X, Y, Z directions, respectively in the example of FIG. 5. Processor 30 may then calculate the magnitude, $A_{xy}$, of the projection of vector, $V_{xyz}$ in the X-Y plane according to the following formula.

$$A_{xy} = \sqrt{A_x^2 + A_y^2} \quad (1)$$

Processor 30 may then calculate the angle, a, between the phone orientation vector, $V_{xyz}$, and the projection of the vector onto the horizontal X-Y plane as a function of the arc tangent of the magnitude, $A_z$, of the vertical component of the orientation vector, $V_{xyz}$ and the magnitude, $A_{xy}$, of the projection of the vector in the X-Y plane. For example, processor 30 may calculate the angle, α, according to the following formula.

$$\alpha = \arctan\left(\frac{A_z}{A_{xy}}\right) \quad (2)$$

In one example, processor 30 approximates the orientation of mobile phone 10 as vertical when the angle, α, between the phone orientation vector, $V_{xyz}$, determined by accelerometer 28 and the projection of the vector onto the horizontal X-Y plane is greater than 50 degrees.

Referring again to FIG. 4, the example method includes turning off a display of the mobile phone (56). For example, in the event proximity sensor 26 detects an object proximate mobile phone 10 and accelerometer 28 determines the orientation of the phone as vertical, processor 30 of the mobile phone may infer that the phone has been raised to the user's head to listen and talk to the other person on the call and may, therefore, turn off display 14.

In some examples, a mobile phone may apply hysteresis in the management of the display of the phone, e.g. to reduce the occurrence of the phone repeatedly toggling between turning the display on and off. For example, mobile phone 10, and, in particular, processor 30 may only turn off display 14 in the event that accelerometer 28 determines the orientation of the phone as vertical for a threshold period of time. In one example, processor 30 may only turn off display 14 in the event accelerometer 28 determines the orientation of the phone as vertical for more than 100 milliseconds.

In one example of the method of FIG. 4, the mobile phone may employ additional parameters to determine whether or not to turn off the display of the phone during a call. In one example, processor 30 is configured to check the manner in which the user is interacting with mobile phone 10 during a phone call before turning of display 14 responsive to proximity sensor 26 detecting an object proximate the phone and accelerometer 28 determining the orientation of the phone as vertical. For example, processor 30 may be configured to determine the audio input/output configuration of mobile phone 10 during a phone call, e.g. the manner in which the user speaks into the phone during the call. In one example, the audio input/output configuration of mobile phone 10 may include at least one of speaking directly into microphone 22, using a speaker phone function where the user holds the phone away from their ear and mouth by some distance and speaks into the microphone and listens to responses from speaker 20, or the user speaks into a headset wired or wirelessly, e.g. a Bluetooth headset connected to the microphone of the phone. In one such example, processor 30 may be configured to turn off display 14 only when proximity sensor 26 detects an object proximate mobile phone 10, accelerometer 28 determines the orientation of the phone as vertical, and the processor determines the audio input/output configuration of the phone as the user speaking directly into microphone 22.

Figure 6:
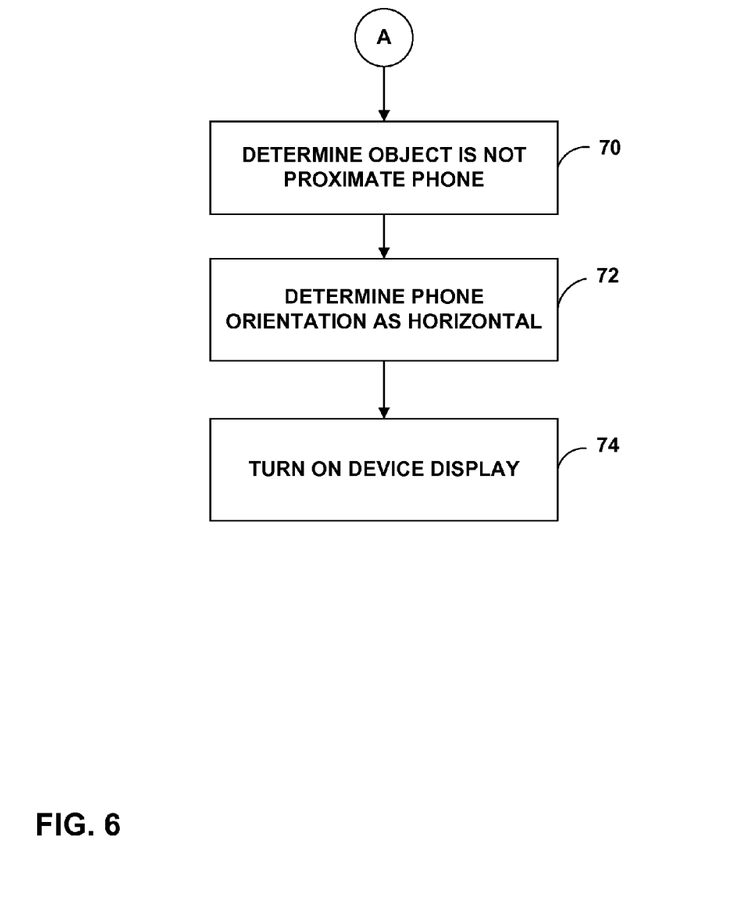
FIGS. 6 and 7 are flowcharts illustrating examples of additional functions associated with managing the display of a mobile device during a phone call.
Figure 7:
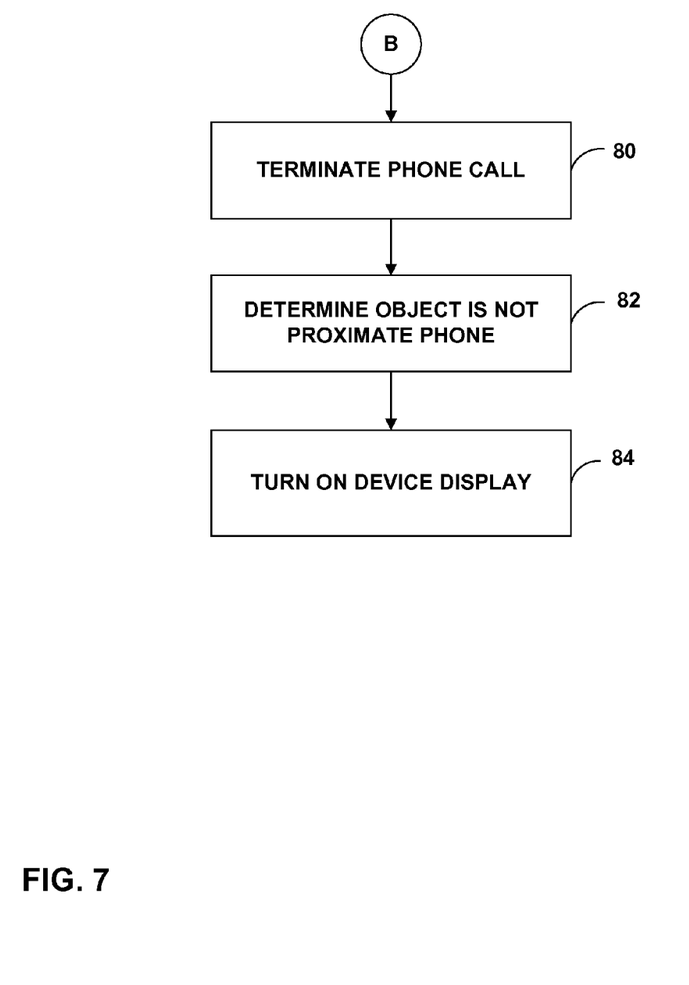

FIGS. 6 and 7 are flowcharts illustrating additional functions that may be executed by a mobile device in examples according to this disclosure to manage the display of the device during a phone call. The functions illustrated in FIGS. 6 and 7 can be executed in association with the example method of FIG. 4. In particular, each of FIGS. 6 and 7 represent additional functions that may be executed, e.g., after the functions illustrated in FIG. 4 have been executed.

In the example of FIG. 6, after turning off the display of a mobile phone responsive to an object detected proximate the phone and the orientation of the phone determined as vertical, the mobile phone may determine that the object is no longer proximate the phone (70). For example, proximity sensor 26 may become deactivated after becoming activated during a phone call using mobile phone 10 such that the sensor does not detect the presence of any objects at or within a threshold distance to the phone. In one example, processor 30 of mobile phone 10 may be configured to infer that the object previously detected as proximate the mobile phone, e.g. the user's head in the example of FIG. 4, is no longer near the phone in the event proximity sensor 26 becomes deactivated.

In addition to determining that the object is not proximate the mobile phone (70), the example of FIG. 6 includes determining the orientation of the phone as horizontal. In one example, accelerometer 28 may determine the orientation of mobile phone 10 as horizontal during the phone call. However, as with the example of FIG. 4, in practice, the orientation of mobile phone 10 may not be exactly or nearly exactly horizontal. Therefore, mobile phone 10, and, in particular, e.g., processor 30 of the phone may be configured to execute an algorithm that determines when mobile phone is approximately horizontal by employing a range of orientations within which the phone's orientation vector as determined by accelerometer 28 may lie to designate the phone in a horizontal orientation for purposes of managing display 14. In one example, processor 30 employs similar techniques described above with reference to FIG. 4 for approximating the orientation of mobile phone 10 as vertical to approximate the orientation of the phone as horizontal.

For example, processor 30 may calculate the angle, α, between a phone orientation vector, $V_{xyz}$, determined by accelerometer 28 and the projection of the vector onto the horizontal X-Y plane illustrated in FIG. 5 as a function of the arc tangent of the magnitude, $A_z$, of the vertical component of the orientation vector, $V_{xyz}$ and the magnitude, $A_{xy}$, of the projection of the vector in the X-Y plane. In one example, processor 30 approximates the orientation of mobile phone 10 as horizontal in the example of FIG. 6 when the angle, a, between the phone orientation vector, $V_{xyz}$, determined by accelerometer 28 and the projection of the vector onto the horizontal X-Y plane is less than or equal to 50 degrees.

The example of FIG. 6 also includes turning on a display of the mobile phone (56). For example, if it is determined that the object is not proximate mobile phone 10 using proximity sensor 26 and accelerometer 28 determines the orientation of the phone as horizontal, processor 30 of the mobile phone may infer that the phone has been lowered away from the user's head to, e.g. access other functions on the phone and may, therefore, turn on display 14.

As with the method of FIG. 4, in some examples of the method of FIG. 6, a mobile phone may apply hysteresis in the management of the display of the phone, e.g. to reduce the occurrence of the phone repeatedly toggling between turning the display on and off. For example, mobile phone 10, and, in particular, processor 30 may only turn display 14 on in the event that accelerometer 28 determines the orientation of the phone as horizontal for a threshold period of time. In one example, processor 30 may only turn on display 14 in the event accelerometer 28 determines the orientation of the phone as horizontal for more than 500 milliseconds.

Another issue in mobile phone display management is when to reactivate a display after a phone call has been terminated. In some cases, activating the phone display too soon after call termination may cause untoward consequences, including, e.g. a user's head inadvertently triggering phone functions in examples in which the display is a touch-screen display. As such, in the example of FIG. 7, after turning off the display of a mobile phone responsive to an object detected proximate the phone and the orientation of the phone determined as vertical during a phone call, the phone call may be terminated (80). However, as illustrated in the example of FIG. 7, before turning on the display (84) of the phone after the call is terminated, the mobile phone may determine that the object is no longer proximate the phone (82). In one example, a phone call on mobile phone 10 may be terminated after proximity sensor 26 detects an object proximate the phone and accelerometer 28 determines the orientation of the phone as vertical while the call was still active. In such an example, processor 30 of mobile phone 10 may be configured to wait until proximity sensor detects that no objects are proximate the phone until the processor turns on display 14.

FIGS. 8A and 8B illustrate two alternative mobile phones in accordance with this disclosure. FIG. 8A illustrates a hinged portable mobile phone, also with a keypad and display. FIG. 8B illustrates a mobile phone with a large touch-screen display that functions to present content to and receive input from users, e.g. in lieu of a traditional number keypad or full QWERTY keypad employed on some mobile devices.

FIG. 8A is a plan view of example mobile phone 100 including housing 102 with hinge 104, display 106, keypad 108, speaker 110, microphone 112, proximity sensor 114, and accelerometer 116. Mobile phone 100, including proximity sensor 114 and accelerometer 116, may be configured and function in accordance with the disclosed examples in a manner similar to that described above with reference to example phone 10 of FIG. 1. Mobile phone 100, however, includes some variations from the previous example. For example, mobile phone 100 includes hinge 104 in housing 102. Hinge 104 may be configured to permit mobile phone 100 to assume a number of physical configurations including the unfolded configuration shown in FIG. 8A and a folded configuration by folding the upper half of the phone including display 106 onto the lower half of the phone including keypad 108. In any event, mobile phone 100, and, in particular, proximity sensor 114 and accelerometer 116 may be configured to manage display 104 during a phone call made with mobile phone 100 in a manner similar to that described with reference to phone 10 of FIG. 1 and other examples described in this disclosure.

FIG. 8B is a plan view of example mobile phone 200 including housing 202, touch-screen display 204, soft keys 206, speaker 208, microphone 210, proximity sensor 212, and accelerometer 214. Mobile phone 200, including proximity sensor 212 and accelerometer 214, may be, as with phone 100 of FIG. 8A, configured and function in accordance with the disclosed examples in a manner similar to that described above with reference to example phone 10 of FIG. 1. Mobile phone 210, however, includes some variations from the previous examples of FIGS. 1 and 8A. For example, mobile phone 210 includes touch-screen display 204. Touch-screen display 204, along with soft keys 206, may form part or all of a user interface for mobile phone 210. Mobile phone 210 may be an integrated personal data assistant (PDA) and mobile phone, which are sometimes referred to as "smart phones." In any event, mobile phone 200, and, in particular, proximity sensor 212 and accelerometer 214 may be configured to manage display 204 during a phone call made with mobile phone 200 in a manner similar to that described with reference to phone 10 of FIG. 1 and other examples described in this disclosure.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
   determining, by a mobile device, that an object is proximate the mobile device using a proximity sensor of the mobile device;
   determining, by the mobile device, that an orientation of the mobile device is an approximately vertical orientation;
   in response to determining that the object is proximate the mobile device and that the orientation of the mobile device is the approximately vertical orientation, automatically turning off a display of the mobile device;
   while the display of the mobile device is turned off:
      receiving one or more voice signals based on audible input received by a microphone the mobile device,
      determining, by the mobile device, that the object is not proximate the mobile device using the proximity sensor, and
      determining, by the mobile device, that the orientation of the mobile device is an approximately horizontal orientation; and
   in response to determining that the object is not proximate the mobile device and that the orientation of the mobile device is the approximately horizontal orientation, automatically turning on the display of the mobile device.

2. The method of claim 1, further comprising determining that the orientation of the mobile device is the approximately horizontal orientation for a threshold period of time before turning on the display.

3. The method of claim 1, wherein determining that the orientation of the mobile device is the approximately horizontal orientation comprises:
   determining an orientation vector of the mobile device; and
   approximating the orientation of the mobile device as horizontal based on the orientation vector.

4. The method of claim 3, wherein approximating the orientation of the mobile device as horizontal based on the orientation vector comprises:
   calculating a first angle between the orientation vector and a projection of the vector onto a plane that is generally perpendicular to the direction of gravity; and
   approximating the orientation of the mobile device as horizontal when the first angle is less than or equal to approximately 50 degrees.

5. The method of claim 1, wherein determining that the object is not proximate the mobile device using the proximity sensor occurs before determining that the orientation of the mobile device is the approximately horizontal orientation.

6. The method of claim 1, further comprising:
   automatically turning off the display of the mobile device in response to at least one of determining that the object is proximate the mobile device a second time using the proximity sensor of the mobile device and determining that the orientation of the mobile device is the approximately vertical orientation a second time.

7. The method of claim 1, wherein determining that the orientation of the mobile device is the approximately vertical orientation comprises:
   determining an orientation vector of the mobile device; and
   approximating the orientation of the mobile device as vertical based on the orientation vector.

8. The method of claim 7, wherein approximating the orientation of the mobile device as vertical based on the orientation vector comprises:
   calculating a first angle between the orientation vector and the projection of the vector onto a plane that is generally perpendicular to the direction of gravity; and
   approximating the orientation of the mobile device as vertical when the first angle is greater than approximately 50 degrees.

9. The method of claim 1, wherein the proximity sensor comprises one of a capacitive, photoelectric, or inductive sensor.

10. The method of claim 1, further comprising determining that the orientation of the mobile device is the approximately vertical orientation for a threshold period of time before turning off the display.

11. The method of claim 1, wherein determining that the object is proximate the mobile device using the proximity sensor comprises determining that the object is a threshold distance away from the mobile device.

12. The method of claim 1, wherein determining that the orientation of the mobile device is the approximately vertical orientation or the approximately horizontal orientation comprises based on one or more signals generated by an accelerometer of the mobile device.

13. The method of claim 12, wherein the accelerometer comprises at least one of a piezoelectric or capacitive accelerometer, and a micro-electro-mechanical system (MEMS).

14. A mobile device comprising:
   a display;
   a microphone;
   a proximity sensor configured to detect a proximity of an object to the mobile device; and
   one or more processors configured to:
      in response to determining that the object is proximate the mobile device and that an orientation of the mobile device is an approximately vertical orientation, automatically turn off the display of the mobile device;
      while the display is turned of:
         receive one or more voice signals based on audible input received by the microphone,
         determine that the object is not proximate the mobile device using the proximity sensor, and
         determine that the orientation of the mobile device is an approximately horizontal orientation; and
      in response to determining that the object is not proximate the mobile device and that the orientation of the mobile device is the approximately horizontal orientation, automatically turning on the display of the mobile device.

15. The mobile device of claim 14, wherein the one or more processors are configured to determine that the orientation of the mobile device is the approximately horizontal orientation for a threshold period of time before turning on the display.

16. The mobile device of claim 14, wherein the one or more processors are configured to determine that the orientation of the mobile device is the approximately vertical orientation for a threshold period of time before turning off the display.

17. The mobile device of claim 14, further comprising an accelerometer, wherein the one or more processors are configured to determine that the orientation of the mobile device is the approximately vertical orientation or the approximately horizontal orientation based on one or more signals generated by the accelerometer.

18. A storage device storing instructions for causing at least one processor to:
  automatically turn off a display of a mobile device in response to determining that an object is proximate the mobile device and that an orientation of the mobile device is an approximately vertical orientation;
  while the display is turned of:
    receive one or more voice signals based on audible input,
    determine that the object is not proximate the mobile device, and
    determine that the orientation of the mobile device is an approximately horizontal orientation; and
  in response to determining that the object is not proximate the mobile device and that the orientation of the mobile device is the approximately horizontal orientation, automatically turning on the display of the mobile device.

19. The storage device of claim 18, further storing instructions for causing the at least one processor to determine that the orientation of the mobile device is the approximately horizontal orientation for a threshold period of time before turning on the display.

20. The storage device of claim 18, further storing instructions for causing the at least one processor to determine that the orientation of the mobile device is the approximately vertical orientation for a threshold period of time before turning off the display.

21. The storage device of claim 18, further storing instructions for causing the at least one processor to determine that the orientation of the mobile device is the approximately vertical orientation or the approximately horizontal orientation based on one or more signals generated by an accelerometer of the mobile device.

* * * * *

UNITED STATES PATENT AND TRADEMARK OFFICE
CERTIFICATE OF CORRECTION

| | | |
|---|---|---|
| PATENT NO. | : 8,626,248 B2 | Page 1 of 1 |
| APPLICATION NO. | : 13/916400 | |
| DATED | : January 7, 2014 | |
| INVENTOR(S) | : Michael Lockwood | |

It is certified that error appears in the above-identified patent and that said Letters Patent is hereby corrected as shown below:

In the Claims

Column 15, line 34, claim 1, "microphone the mobile device," should be changed to -- microphone of the mobile device --

Signed and Sealed this
Twelfth Day of May, 2015

Michelle K. Lee
*Director of the United States Patent and Trademark Office*